United States Patent Office 3,323,782
Patented June 6, 1967

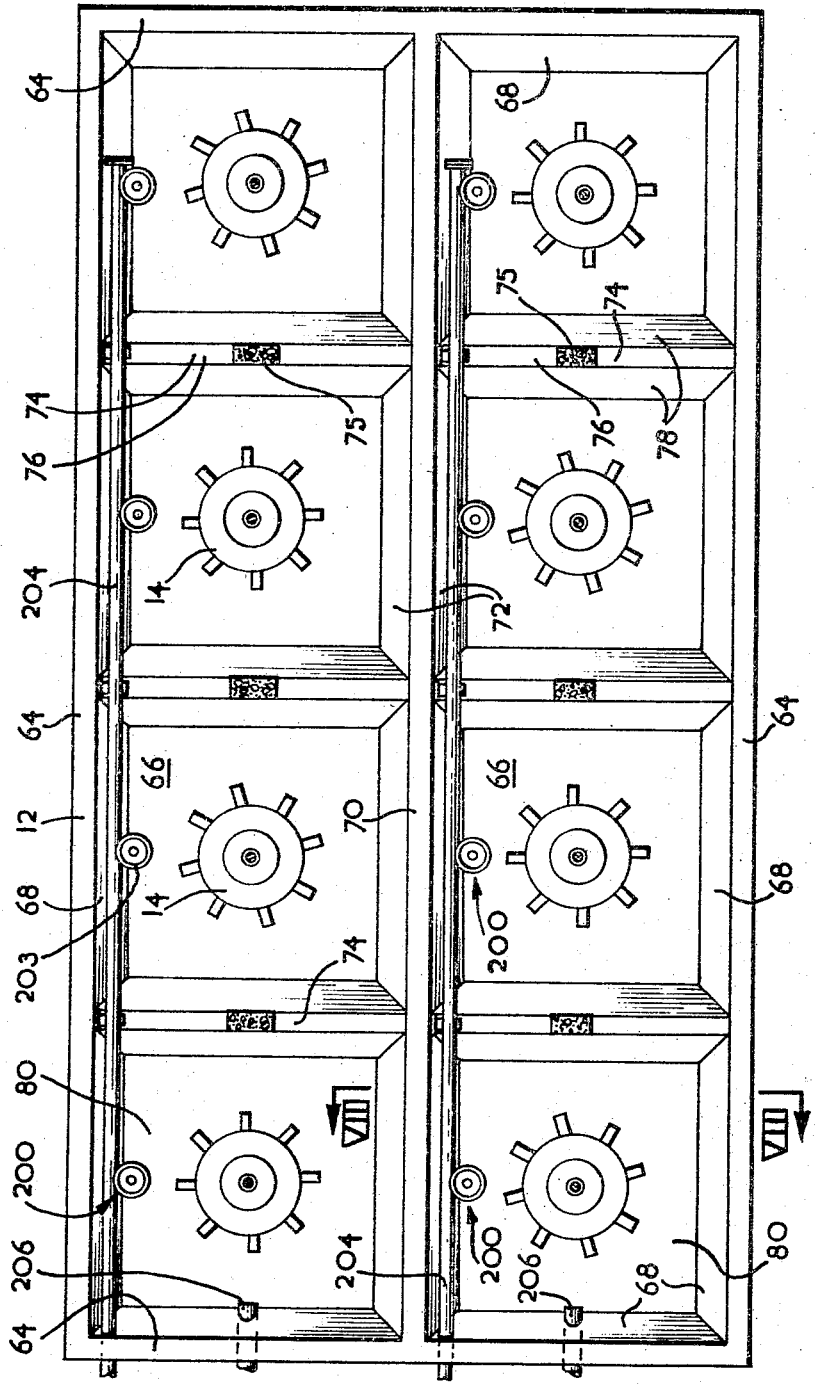

3,323,782
AERATION OF LIQUIDS
George F. G. Clough, Adlington, Macclesfield, England, assignor to Simon-Carves Limited, Stockport, Cheshire, England, a British company
Filed Sept. 13, 1965, Ser. No. 486,990
Claims priority, application Great Britain, Sept. 25, 1964, 39,130/64
11 Claims. (Cl. 259—108)

This invention is concerned with improvements in or relating to the aeration of liquids.

In a previously proposed method of aerating a liquid, for example, a domestic effluent liquid, viz. sewage or an industrial effluent liquid, a surface aeration device is rotated in the liquid adjacent the surface thereof.

It is an object of the invention to provide an improved surface aeration device adapted for use in a method of this kind.

There is also described hereinafter with reference to the accompanying drawings an effluent treatment plant embodying the invention. This plant comprises a rotatable surface aeration device comprising (a) a converging shell, providing a support web, the device being rotatable about the axis of the shell, and (b) a plurality of planar blades each of which extends along an outer surface of the shell, that blade length which is coextensive with said outer surface converging inwardly for at least a major portion of the length of the blade.

There now follows a description, to be read with reference to the accompanying drawings, of the effluent treatment plant embodying the invention. This description is given by way of example of the invention only and not by way of limitation thereof.

In the drawings:

FIGURE 2 shows a diagrammatic plan view of the apparatus;

Figure 1:
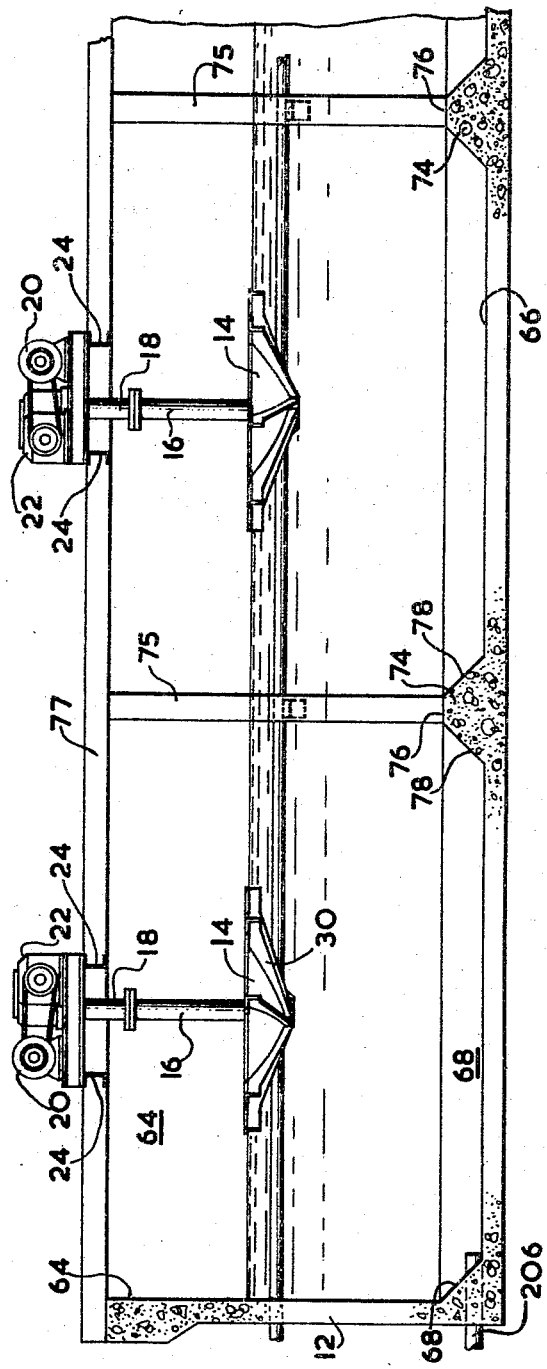
FIGURE 1 shows a sectional side view of parts of a first plant embodying the invention.

The first plant comprises liquid aeration apparatus comprising a tank 12 and a plurality of rotatable surface aeration devices 14 mounted for rotation about parallel axes in an upper portion of the tank 12. Each device 14 is secured to a vertical shaft 16 which is secured to a shaft 18 which in the operation of the apparatus is rotated by a motor 20 through a gear box 22; each motor 20 is supported on girders 24 extending across the tank 12. In the operation of the apparatus the tank 12 contains an effluent liquid, e.g. sewage or an industrial effluent, and bacteria adapted to treat the effluent liquid for disposal; the rotating aeration devices 14 are only partially immersed in the liquid; the liquid is passed continuously through the tank.

Figure 4:
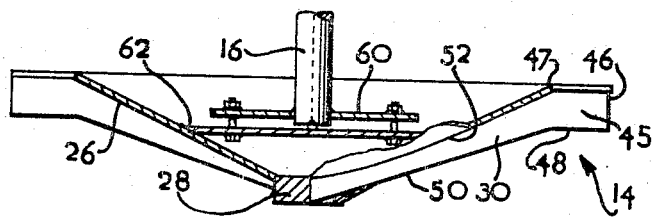
FIGURE 4 shows a part sectional view corresponding to FIGURE 3.
Figure 3:
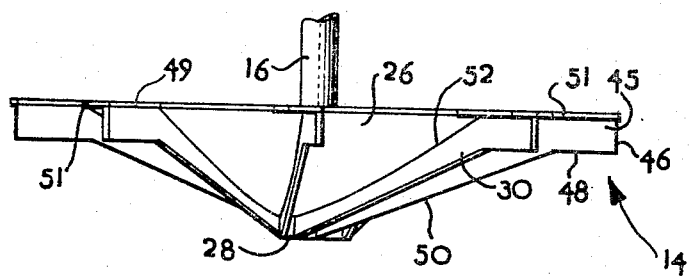
FIGURE 3 shows a side view of an aeration device of the plant.
Figure 5:
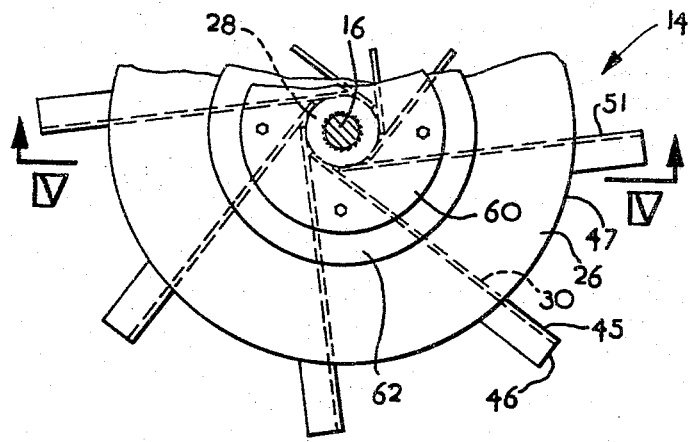
FIGURE 5 shows a top plan view corresponding to FIGURE 3.

Each aeration device 14 (FIGURES 3, 4 and 5) comprises an inverted symmetrical frusto-conical shell 26 coaxial with the shaft 16, a circular cylindrical projection 28 of small diameter secured to and extending downwardly from the shell 26 co-axially with the axis of the shell 26, and a plurality of thin flat blades 30 each of which lies in a plane parallel to the axis of the shell 26, and extends from the periphery of the projection 28 tangentially of the projection 28 along the lower major surface of the shell 26; the blades 30 each extend from the projection 28 in the same sense. It will be noted that the shell 26 provides a support for the blades 30.

The shaft 16 has a circular plate 60 secured thereto and the plate 60 is detachably secured to a flat horizontal plate 62 extending across the interior of the shell 26 and secured thereto. Each blade 30 has an end portion 45 extending outwardly from the outer periphery 47 of the shell 26. Each end portion 45 has a straight horizontal upper edge 49, and has a horizontal plate 51 which extends generally circumferentially from the edge 49 on the side of the blade 30 remote from the projection 28, and outwardly from the outer periphery 47 of the shell 26. The plates are co-planar, lying generally in the plane of the outer periphery 47 of the shell 26. In the operation of the apparatus the device 14 is rotated in the sense in which the plates 51 extend circumferentially from the blades 30, with the plates 51 just above or at the level of the liquid in the tank 12.

Each end portion 45 has a straight vertical outer edge 46 and a straight horizontal lower edge 48. Each blade 30 has a straight sloping lower edge 50 extending from the edge 48 and a curved upper edge 52 extending from the edge 49 which edge 52 is in contact with the lower surface of the shell 26 throughout its length; the depth of the blade 30, measured between the edges 50, 52, converges in the plane of the blade 30 inwardly from the end portion 45 towards the projection 28 for a major portion of that blade length which extends from the end portion 45 and is coextensive with said lower surface; the depth of the blade converges until the edge 50 is parallel to the tangent to the edge 52, and then diverges slightly for the remainder of the length of the blade 30.

The tank 12 comprises four outer vertical side walls 62 (FIGURE 2) which are connected to a generally horizontal base wall 66 (FIGURES 1 and 2) by short surfaces 68 which slope at an angle of 45°. The tank 12 also comprises a further vertical wall 70 which extends from one, shorter, side wall 64 to the opposite, shorter, side wall 64; the wall 70 is connected to the base wall 66 by short surfaces 72 on either side thereof which surfaces 72 also slope at angle of 45°. The tank 12 further comprises a plurality of straight projections 74 which extend along the base wall 66 at right angles to the wall 70; each projection 74 extends from the wall 70 to an opposite, longer, wall 64, and provides a horizontal upper surface 76 and side surfaces 78 which slope downwardly to the base wall 66 from either side of the surface 76 at an angle of 45°. The surfaces 68, 72, 78 are all of the same height. Vertical pillars 75 of rectangular cross section extend upwardly from the projections 74 to support beams 77 (only one of which is shown) which support the girders 24; one pillar 75 extends from each projection 74. The surfaces 68, 72, 78 together defines a plurality of similar aeration localities 80 in the centre of each of which is provided an aeration device 14. The lacalities 80 are provided in two rows of four, the rows being divided from each other by the wall 70. The localities 80 of each row are in communication.

The devices 14 of adjacent, communicating, localities 80 are mirror images and in the operation of the apparatus are rotated in opposite senses.

Figure 8:
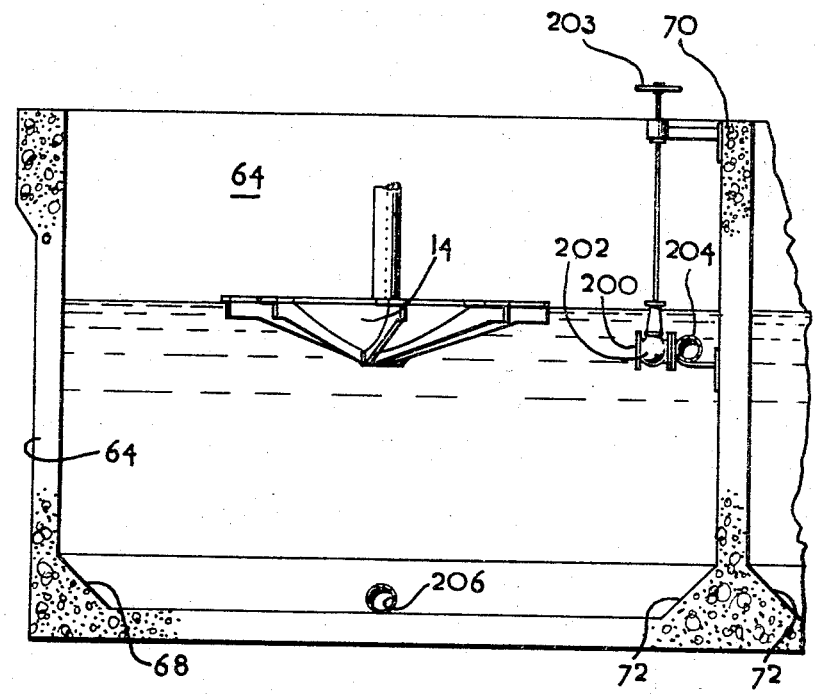
FIGURE 8 shows a section on the line VIII—VIII of FIGURE 2, with certain parts omitted or broken away.

The tank 12 comprises drain outlets 206 (FIGURES 1, 2 and 8) and liquid inlets 200 each comprising a valve 202, which is submerged in the operation of the apparatus, and an operating handle 203; the valves 202 lead from submerged horizontal inlet pipes 204; there is one valve 202 for each locality 80. In the operation of the apparatus liquid flows continuously from the valves 202 through the tank 12 and out over outlet weirs (not shown).

The second plant corresponds generally in construction, arrangement and mode of operation to the first plant and is described in so far as it differs therefrom.

Figure 6:
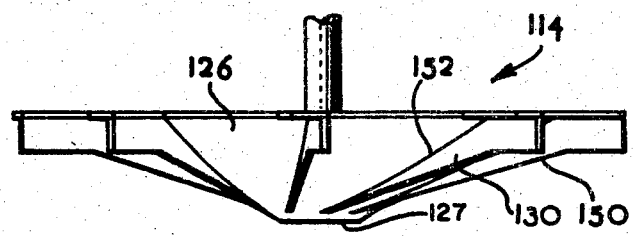
FIGURE 6 shows a side view of an aeration device of a second plant embodying the invention.
Figure 7:
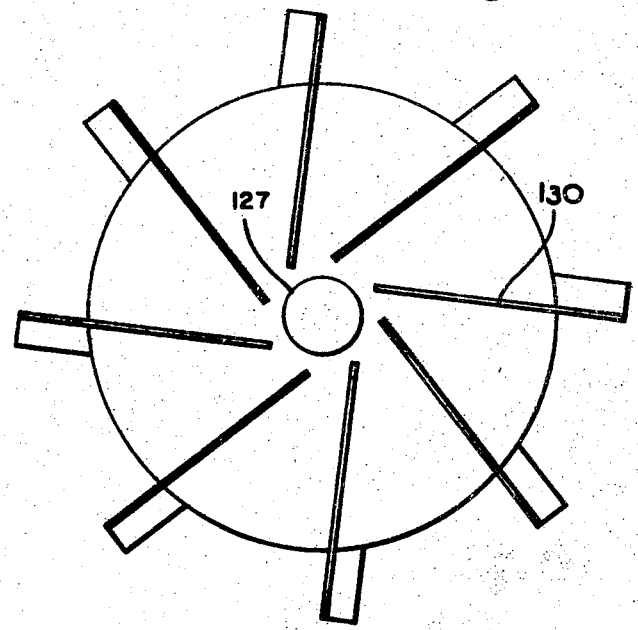
FIGURE 7 shows a bottom plan view corresponding to FIGURE 6.

In the second plant the aeration devices 14 are each replaced by aeration devices 114 (FIGURES 6 and 7).

The aeration devices 114 correspond generally in construction, arrangement and mode of operation to the aeration devices 14 and are described in so far as they differ therefrom.

Each device 114 comprises a shell 126, corresponding to the shell 26. The shell 126 terminates at its narrow end without any circular cylindrical projection and a flat circular plate 127 extends across the narrow end of the shell 126 being bounded by the inner periphery of the shell 126; the plate 127 is normal to and co-axial with the axis of the device 114. The device 114 also comprises a plurality of blades 130 corresponding to the blades 30. Each blade 130 lies in a plane which is tangential to the plate 127, and has a straight sloping lower edge 150 and a curved upper edge 152; the depth of the blade 130, measured between the edges 150, 152, converges towards the plate 127 for a major portion of that blades length which is co-extensive with the lower surface of the shell 126; the depth of blade 130 converges until the edges 150, 152 meet at a point outside the plate 127 at which point the blade 130 terminates, the edge 150 being tangential to the edge 152 at that point.

It will be realised that the aeration devices 14, 114 may be used for other purposes besides the treatment of effluent liquids; for example they may be used for removing carbon dioxide from an aqueous liquid.

I claim:

1. A rotatable surface aeration device comprising (a) a converging shell, providing a support web, the device being rotatable about the axis of the shell, and (b) a plurality of planar blades each of which extends along an outer surface of the shell, the depth of each blade converging inwardly for at least a major portion of that blade length which is co-extensive with said outer surface.

2. A rotatable surface aeration device comprising (a) a frusto-conical shell, providing a support web, the device being rotatable about the axis of the shell, and (b) a plurality of planar blades each of which extends along an outer surface of the shell, the depth of each blade converging inwardly for at least a major portion of that blade length which is co-extensive with said outer surface.

3. A rotatable surface aeration device comprising (a) a converging shell, providing a support web, the device being rotatable about the axis of the shell, and (b) a plurality of thin planar blades each of which extends along an outer surface of the shell, has an end portion extending outwardly from the outer periphery of the shell and has a plate member extending circumferentially from said end portion and outwardly from said outer periphery, the depth of each blade converging inwardly for at least a major portion of that blade length which is co-extensive with said outer surface.

4. A rotatable surface aeration device comprising (a) a converging shell, providing a support web, the device being rotatable about the axis of the shell, and (b) a plurality of planar blades each of which extends along an outer surface of the shell, and lies in a plane parallel to the axis of rotation of the device and tangenital to a circular locality of small diameter which is co-axial with said axis, each blade extending from the locality in the same sense and the depth of each blade converging inwardly for at least a major portion of that blade length which is co-extensive with said outer surface.

5. A device according to claim 3 wherein each blade lies in a plane parallel to the axis of rotation of the device and tangential to a circular locality of small diameter which is co-axial with said axis, each blade extending from the locality in the same sense, and each plate member extends from its blade on the side of the blade remote from the circular locality.

6. A rotatable surface aeration device comprising (a) a converging shell, providing a support web, the device being rotatable about the axis of the shell, and (b) a plurality of thin planar blades each of which extends along an outer surface of the shell, has an end portion extending outwardly from the outer periphery of the shell and has a horizontal plate member extending circumferentially from said end portion and outwardly from said outer periphery, the depth of each blade converging inwardly for at least a major portion of that blade length which is co-extensive with said outer surface, and the plate members being co-planar.

7. Liquid aeration apparatus comprising (a) a liquid container having an upper portion, (b) a rotatable surface aeration device located in said upper portion and comprising (i) a converging shell providing a support web, the device being rotatable about the axis of the shell, and (ii) a plurality of planar blades each of which extends along an outer surface of the shell, the depth of each blade converging inwardly for at least a major portion of that blade length which is co-extensive with said outer surface, and (c) means for rotating the aeration device.

8. A rotatable surface aeration device comprising (a) a converging shell, providing a support web, the device being rotatable about the axis of the shell, and (b) a plurality of planar blades each of which extends along an outer surface of the shell and has an end portion extending outwardly from the outer periphery of the shell, the depth of each blade converging inwardly from the outer end portion of the blade for at least a major portion of that blade length which is co-extensive with said outer surface.

9. A rotatable surface aeration device comprising (a) a support web, and (b) a plurality of planar blades each of which extends along a major surface of the web, the depth of each blade converging inwardly for at least a major portion of that blade length which co-extensive with said major surface.

10. Liquid aeration apparatus comprising (a) a container containing liquid to be aerated, (b) a vertical shaft rotatable about its axis which is disposed centrally of the container, (c) a surface aeration device secured on the shaft for rotation therewith in the container, said device comprising an inverted symmetrical frusto-conical shell co-axial with the shaft, a circular cylindrical projection extending downwardly from the shell co-axially therewith, and a plurality of thin vertical planar blades, each of which (i) extends, in the same sense, from the periphery of the projection tangentially of the projection along the lower surface of the shell, (ii) has an end portion extending outwardly from the outer periphery of the shell, and (iii) has a horizontal flat plate generally in the plane of the outer periphery of the shell, adjacent the liquid level, and extending circumferentially from said each portion on the side of its blade remote from the projection and outwardly from the outer periphery of the shell, the depth of each blade converging inwardly from said end portion for at least a major portion of that blade length which is co-extensive with said lower surface, and (d) a motor arranged to rotate the shaft in the sense in which the plates extend circumferentially from the blades.

11. A rotatable liquid surface aeration device disposed on a vertical axis of rotation and comprising a support member having an upwardly diverging generally conical imperforate lower surface, a plurality of relatively thin straight identical planar blades having their upper edges secured to and extending along said support surface, said blades being substantially equiangularly spaced and each blade extending tangentially to a circle having its center on the axis of rotation of said device, and a horizontal plate on the upper edge of each blade outside the rim of said support member, each of said blades converging in depth inwardly from the outer end portion of the blade for at least a major portion of that blade length which is co-extensive with said support surface, all of said plates being substantially co-planar with the upper edge of said support member, and each plate projecting from its respective blade in the direction of normal operative rotation of said device.

References Cited

UNITED STATES PATENTS

| | | | |
|---|---|---|---|
| 2,802,647 | 8/1957 | Bolton | 261—84 |
| 2,984,189 | 5/1961 | Jekat | 103—88 |
| 3,200,754 | 8/1965 | Burgin | 103—88 |
| 3,246,882 | 4/1966 | Clough | 259—135 |

FOREIGN PATENTS

| | | |
|---|---|---|
| 626,576 | 8/1961 | Canada. |
| 919,467 | 2/1963 | Great Britain. |

IRVING BUNEVICH, *Primary Examiner.*

WALTER A. SCHEEL, R. W. JENKINS,
*Assistant Examiners.*